United States Patent
Gero et al.

(10) Patent No.: US 9,876,820 B2
(45) Date of Patent: *Jan. 23, 2018

(54) PROVIDING FORWARD SECRECY IN A TERMINATING TLS CONNECTION PROXY

(71) Applicant: Akamai Technologies, Inc., Cambridge, MA (US)

(72) Inventors: Charles E. Gero, Quincy, MA (US); Philip A. Lisiecki, Santa Barbara, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/633,312

(22) Filed: Jun. 26, 2017

(65) Prior Publication Data

US 2017/0302700 A1  Oct. 19, 2017

Related U.S. Application Data

(63) Continuation of application No. 15/390,574, filed on Dec. 26, 2016, now Pat. No. 9,692,736, which is a (Continued)

(51) Int. Cl.
*H04L 29/06* (2006.01)

(52) U.S. Cl.
CPC ........ *H04L 63/166* (2013.01); *H04L 63/0435* (2013.01); *H04L 63/0442* (2013.01); *H04L 63/061* (2013.01); *H04L 63/0823* (2013.01)

(58) Field of Classification Search
CPC ............... H04L 63/061; H04L 2209/76; H04L 63/0442; H04L 9/0825

(Continued)

(56) References Cited

U.S. PATENT DOCUMENTS 6,094,485 A * 7/2000 Weinstein ............. H04L 63/105
                                                380/30
2005/0210251 A1 * 9/2005 Nyberg ............... H04L 63/0869
                                                713/169

(Continued)

OTHER PUBLICATIONS

Du et al, A CSK Based SSL Handshake Protocol, 2009, IEEE, pp. 600-603.*

(Continued)

*Primary Examiner* — Christopher Brown
*Assistant Examiner* — Jenise Jackson
(74) *Attorney, Agent, or Firm* — David H. Judson

(57) ABSTRACT

An infrastructure delivery platform provides a RSA proxy service as an enhancement to the TLS/SSL protocol to off-load, from an edge server to an external cryptographic server, the decryption of an encrypted pre-master secret. The technique provides forward secrecy in the event that the edge server is compromised, preferably through the use of a cryptographically strong hash function that is implemented separately at both the edge server and the cryptographic server. To provide the forward secrecy for this particular leg, the edge server selects an ephemeral value, and applies a cryptographic hash the value to compute a server random value, which is then transmitted back to the requesting client. That server random value is later re-generated at the cryptographic server to enable the cryptographic server to compute a master secret. The forward secrecy is enabled by ensuring that the ephemeral value does not travel on the wire.

8 Claims, 4 Drawing Sheets

Related U.S. Application Data continuation of application No. 14/573,894, filed on Dec. 17, 2014, now Pat. No. 9,531,691, which is a continuation-in-part of application No. 13/714,656, filed on Dec. 14, 2012, now Pat. No. 9,647,835.

(60) Provisional application No. 61/576,378, filed on Dec. 16, 2011.

(58) Field of Classification Search
USPC .......................................................... 713/151
See application file for complete search history.

(56) References Cited

U.S. PATENT DOCUMENTS

| | | | |
|---|---|---|---|
| 2008/0216150 A1* | 9/2008 | Brabson | H04L 63/0823 726/1 |
| 2011/0231655 A1* | 9/2011 | Bollay | H04L 63/166 713/153 |
| 2012/0117375 A1* | 5/2012 | Kanekar | H04L 63/166 713/151 |
| 2014/0244998 A1* | 8/2014 | Amenedo | H04L 63/062 713/156 |

OTHER PUBLICATIONS

Castelluccia et al, Improving Secure Server Performance by REbalancing SSL/TLS Handshakes, 2006, ACM, pp. 26-34.*
Qing et al, Analysis and Comparison of Several Algorithms in SSL/TLS Handshake Protocol, 2009, IEEE, pp. 613-617.*

* cited by examiner

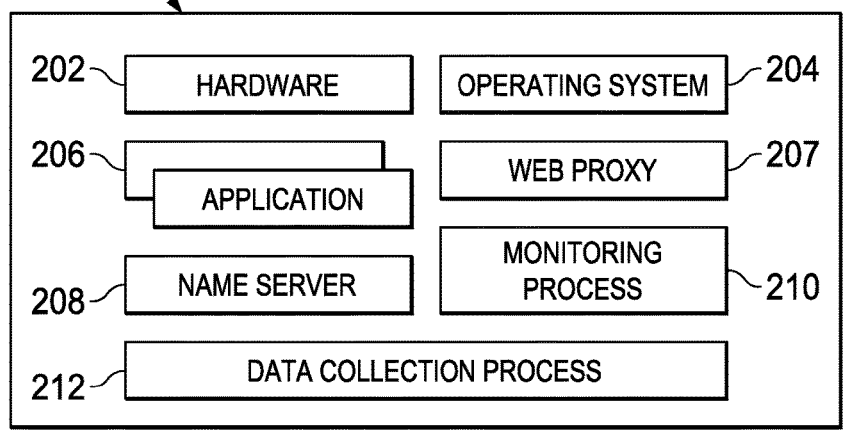
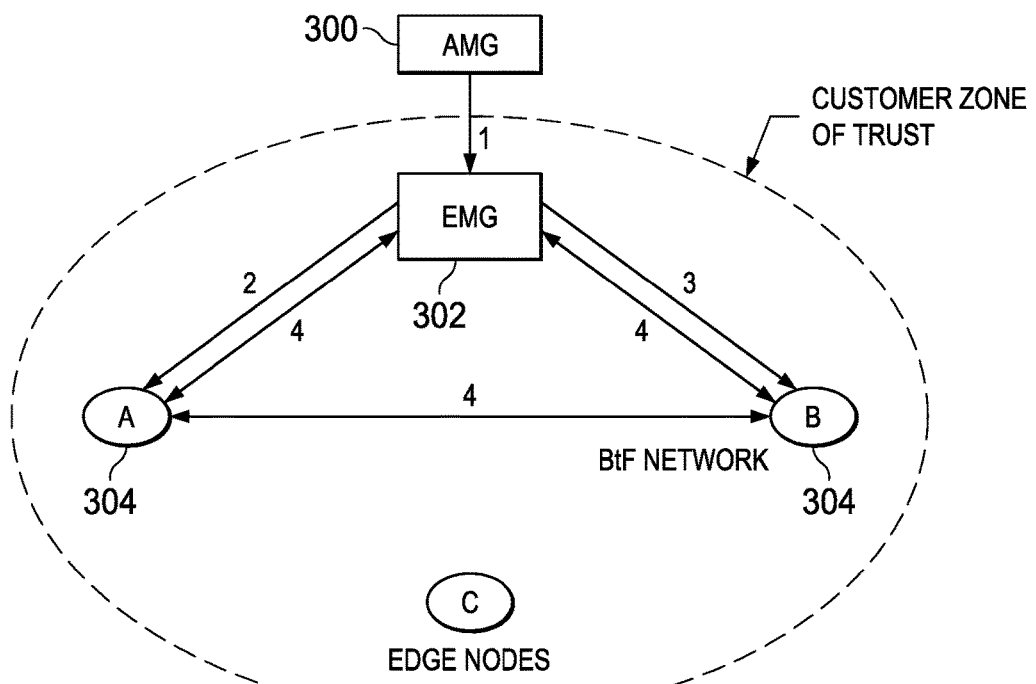

PROVIDING FORWARD SECRECY IN A TERMINATING TLS CONNECTION PROXY

BACKGROUND

Technical Field

This application relates generally to secure network-based communications using cryptographic protocols such as SSL.

Brief Description of the Related Art

Distributed computer systems are well-known in the prior art. One such distributed computer system is a "content delivery network" or "CDN" that is operated and managed by a service provider. The service provider typically provides the content delivery service on behalf of third parties (customers) who use the service provider's infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network. A digital property typically is bound to one or more edge configurations that allow the service provider to account for traffic and bill its customer.

Secure Sockets Layer (SSL) is a well-known cryptographic protocol that is used to secure communications over networks such as the Internet. Cryptographic protocols such as SSL are often based on public key cryptographic systems, such as the RSA (Rivest, Shamir and Adelman) encryption algorithm. For a traditional RSA-based SSL session, the two sides of a connection agree upon a "pre-master secret" (PMS) which is used to generate the parameters for the remainder of the session. Typically, the two sides use RSA asymmetric encryption to establish the pre-master secret without exchanging the actual value in plaintext. In operation, the SSL client generates the pre-master secret and encrypts it with the SSL server's publicly available RSA key. This generates an encrypted pre-master secret (ePMS), which is then provided to the SSL server. The SSL server has a private decryption key, which is then used to decrypt the encrypted pre-master secret. At this point, both the client and the server have the original pre-master secret and can use it to generate the symmetric key used for actual encrypted and secure data exchange.

Decrypting the encrypted pre-master secret is the only time in the SSL connection that the private key is needed. This decryption occurs at a so-called SSL termination point. In many instances, the SSL termination point is insecure, and thus the storage and use of that key there presents significant security risks.

To address this problem, it is known to provide an Internet infrastructure delivery platform (e.g., operated by a service provider) provides an RSA proxy "service" as an enhancement to the SSL protocol that off-loads the decryption of the encrypted pre-master secret (ePMS) to an external server. Using this service, instead of decrypting the ePMS "locally," the SSL server proxies (forwards) the ePMS to an RSA proxy server component and receives, in response, the decrypted pre-master secret. In this manner, the decryption key does not need to be stored in association with the SSL server.

In one system embodiment, such as described in U.S. Publication No. 2013/0156189, at least one machine in a first network-accessible location includes an RSA proxy server software program, and at least one machine in a second network-accessible location includes an RSA proxy client software program. The RSA proxy server software program and the RSA proxy client software program each include code to establish and maintain a secure (e.g., a mutually-authenticated SSL) connection there-between. The RSA proxy client software typically executes in association with an SSL server component (such as OpenSSL). According to this disclosure, however, SSL decryption keys are not accessible to the RSA proxy client software. Rather, decryption of encrypted pre-master secrets is off-loaded to the RSA proxy server software program. In operation, the RSA proxy client software program receives and forwards to the RSA proxy server software program over the mutually-authenticated SSL connection an encrypted pre-master secret associated with a new SSL handshake request received (at the RSA proxy client) from an end user client program (e.g., an SSL-enabled web browser, a native mobile app, or the like). The RSA proxy server software program decrypts the encrypted pre-master secret using a decryption key that is maintained at the RSA proxy server software program and not otherwise accessible to the RSA proxy client software program. The RSA proxy server software program then returns a decrypted pre-master secret to the RSA proxy client software program over the mutually-authenticated SSL connection. The end user client program and the SSL server component both are then in possession of the pre-master secret (and can use it to generate the symmetric key used for encrypting the connection between them).

Optimally, the RSA proxy server component has good security, and there is an encrypted and authenticated bi-directional communication channel with the RSA proxy client component to communicate the requests. If, however, security of the RSA proxy client component cannot be fully assured (or the server on which this component executes is compromised), an individual (or computing entity) who had been watching and recording communications between the requesting client and the RSA proxy client component could gain access to the archived encrypted streams. This malicious third party entity would do this by simply forwarding captured ePMS's along to the RSA proxy server component, which might then decrypt them as if the request were coming from the intermediary, thereby potentially allowing the malicious third party to gain access to the stream's contents. An observer also might be inclined to represent to the RSA proxy server component that the intermediary has succumbed to a break-in; upon learning this untruth, the RSA proxy server component might then simply sever all communications and no longer decrypt ePMSs on the RSA proxy client component's behalf. Even if audit protections are in place to protect against such schemes, time may pass before any such break-in is detected and during which valid decryptions can be requested on behalf of the bad actor.

The subject matter herein addresses this problem of the ePMS decryption request itself potentially being a vector for defeating forward secrecy.

BRIEF SUMMARY

This disclosure provides a method operative in an RSA proxy to secure a keying material decryption stage itself from replay attacks, and to provide forward secrecy for that leg of communication.

In particular, an infrastructure delivery platform provides a RSA proxy service as an enhancement to the TLS/SSL protocol to off-load, from an edge server to an external cryptographic server, the decryption of an encrypted pre-master secret. As a further enhancement, the technique provides forward secrecy in the event that the edge server is compromised, preferably through the use of a cryptographically strong hash function. In this approach, there is a requesting client, an edge server host process, and a remote cryptographic server. The requesting client and the edge server host process engage in a TLS handshake. To this end, the client sends the ClientHello message, including a list of supported cipher suites and a client random value. In response, and according to the technique of this disclosure, the edge server selects an ephemeral value n, and applies a cryptographic hash to n to compute a server random value, the latter value then being transmitted back to the requesting client in a ServerHello message that is part of the TLS handshake. After the edge server also hands back to the requesting client the selected certificate and provides a ServerHelloDone message, the requesting client generates the pre-master secret, encrypts it with the certificate's public key, and sends it (the encrypted pre-master secret) to the edge server host process in a ClientKeyExchange message. The edge server host process, which is unable to decrypt the pre-master secret (because it does not hold the decryption key), then sends the encrypted pre-master secret to the cryptographic server along with the client random value and the ephemeral n. After sending this information, the edge server host process purges the ephemeral value n from its memory. At the cryptographic server, the same cryptographic hash is applied to n to re-compute the server random value. The cryptographic server then decrypts the pre-master secret, calculates the master secret using the given information (including the client random value forwarded from the edge server host process and the server random value computed from n), and sends the master secret back to the edge server host process. The edge server host process then completes the TLS handshake with the requesting client.

The described approach provides forward secrecy to the terminating TLS proxy by ensuring that the ephemeral value used to compute the server random value is never available in the clear during transport.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the disclosed subject matter and the advantages thereof, reference is now made to the following descriptions taken in conjunction with the accompanying drawings, in which:

FIG. 2 is a representative CDN edge machine configuration;

FIG. 3 illustrates a representation behind-the-firewall network configuration in which the subject disclosure may be practiced in one embodiment.

DETAILED DESCRIPTION

Figure 1:
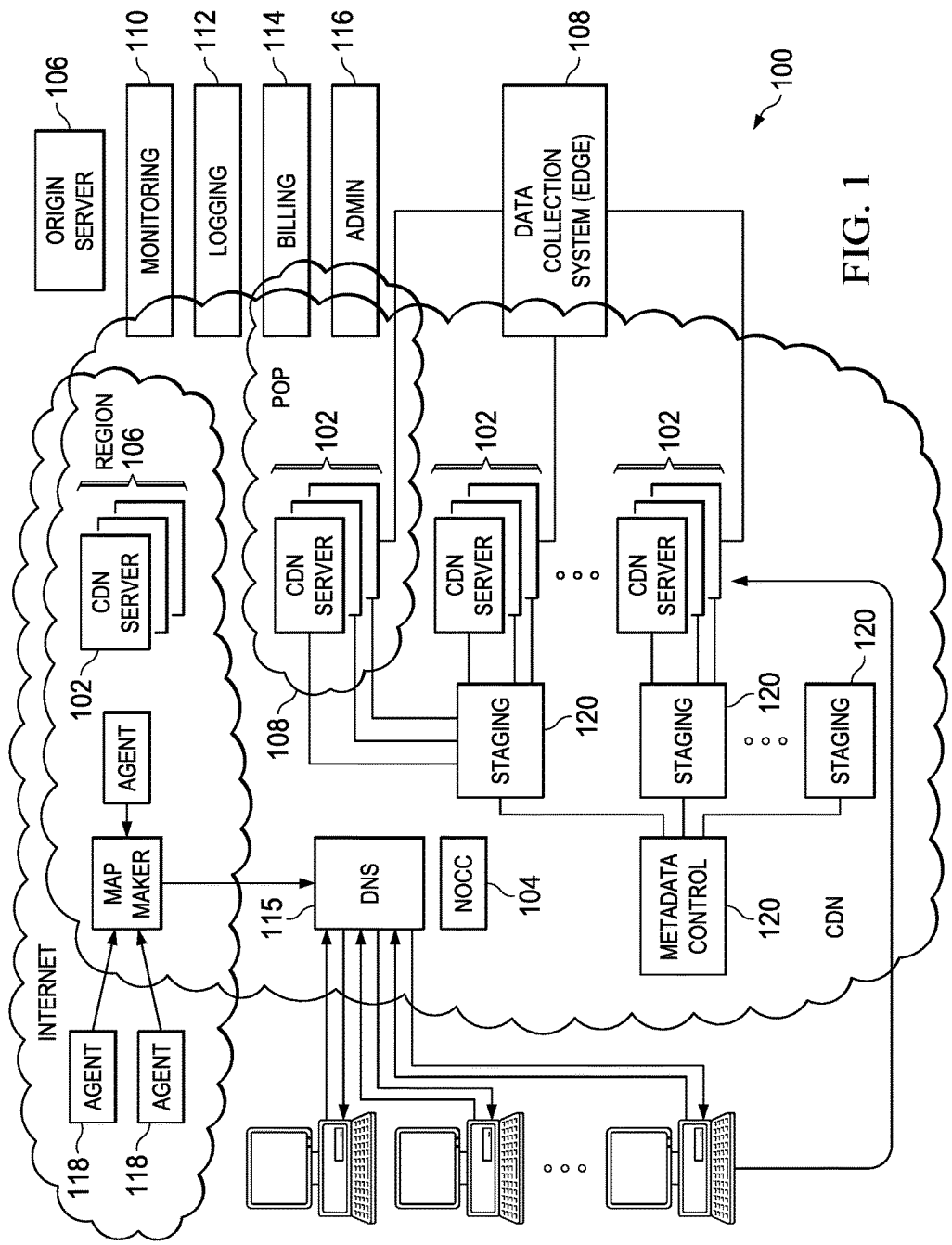
FIG. 1 is a block diagram illustrating a known distributed computer system configured as a content delivery network (CDN)

FIG. 1 illustrates a known distributed computer system that (as described below) is extended by the techniques herein to provide a single HTTP-based platform with the ability to deliver online HD video at broadcast audience scale to the most popular runtime environments and to the latest devices in both fixed line and mobile environments.

In a known system, such as shown in FIG. 1, a distributed computer system 100 is configured as a CDN and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

As illustrated in FIG. 2, a given machine 200 comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" or "ghost" process), a name server 208, a local monitoring process 210, a distributed data collection process 212, and the like. For streaming media, the machine typically includes one or more media servers, such as a Windows Media Server (WMS) or Flash server, as required by the supported media formats.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S.

Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

As an overlay, the CDN resources may be used to facilitate wide area network (WAN) acceleration services between enterprise data centers (which may be privately-managed) and third party software-as-a-service (SaaS) providers.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

By way of further background, CDN customers may subscribe to a "behind the firewall" managed service product to accelerate Intranet web applications that are hosted behind the customer's enterprise firewall, as well as to accelerate web applications that bridge between their users behind the firewall to an application hosted in the internet cloud. To accomplish these two use cases, CDN software may execute on virtual machines hosted in one or more customer data centers, and on virtual machines hosted in remote "branch offices." The CDN software executing in the customer data center typically provides service configuration, service management, service reporting, remote management access, customer SSL certificate management, as well as other functions for configured web applications. The software executing in the branch offices provides last mile web acceleration for users located there. The CDN itself typically provides CDN hardware hosted in CDN data centers to provide a gateway between the nodes running behind the customer firewall and the service provider's other infrastructure (e.g., network and operations facilities. This type of managed solution provides an enterprise with the opportunity to take advantage of CDN technologies with respect to their Company's intranet. FIG. 3 illustrates a basic architecture of this type. In a representative implementation, a BTF network is managed by a management gateway (AMG) 300 and one or more enterprise management gateways (EMGs) 302. The AMG is located at a CDN operation and network service location. It manages a database of existing customers and has access to the EMGs. EMGs 302 exist inside the customer's firewall and manage the individual end nodes 304 of the BTF network. The end nodes correspond to the edge nodes in a traditional CDN. An AMG authorizes an EMG (step 1), and the EMG authorizes edge nodes A and B (steps 2 and 3). Both edge nodes now trust each other and the EMG to create a customer zone of trust as depicted (steps 4). According to this basic trust model, the AMG 300 grants authority to an EMG 302 to perform BTF functions for a company. The EMG 302 may then grant authority to each of the end nodes to perform various roles or tasks. Once trust is established via this chain of authorization, private data and secrets can be exchanged securely around the network. In this approach, the edge nodes typically are installed at remote branch offices (near the end users) and the EMG (parent nodes/regions) are installed at corporate hubs (typically, where application servers are located). As noted above, the solution extends acceleration for the enterprise to applications served anywhere on the Internet, such as SaaS (Software-As-A-Service) applications. By bridging an enterprise's CDN-based private overlay network with the existing CDN public internet overlay network, an end user at a remote branch office obtains an accelerated application end-to-end.

For BTF to properly accelerate SSL traffic, it needs the SSL keys and certificates on the end nodes. As described above, SSL uses a one-time RSA decryption to establish a private pre-master secret between the client and server. According to this disclosure, this RSA decryption is off-loaded to a secure end node or other service which contains the private key, while the rest of the handshake and SSL connection continue as normal. This process is now described.

Terminating SSL/TLS Connections without Locally-Accessible Private Keys

With the above as background, the subject matter of U.S. Publication No. 2013/0156189 is now described. Familiarity with SSL/TLS handshaking is presumed. By way of reminder, during the TLS handshake, the client and server use public-key cryptography to confidentially agree on a 48-byte value called the pre-master secret. This value is used to derive the master secret, which in turn is used to generate the symmetric encryption keys and MAC secrets that are used to ensure privacy and data integrity for the lifetime of the session. The TLS handshake protocol is defined in such a way that the server would normally need to be in possession of the private half of the key in order to arrive at the same pre-master secret as the client. In the model herein, a server machine can work around this requirement by utilizing cryptographic server instance (which does have access to the private key) to do the necessary private-key operation on its behalf.

Figure 4:
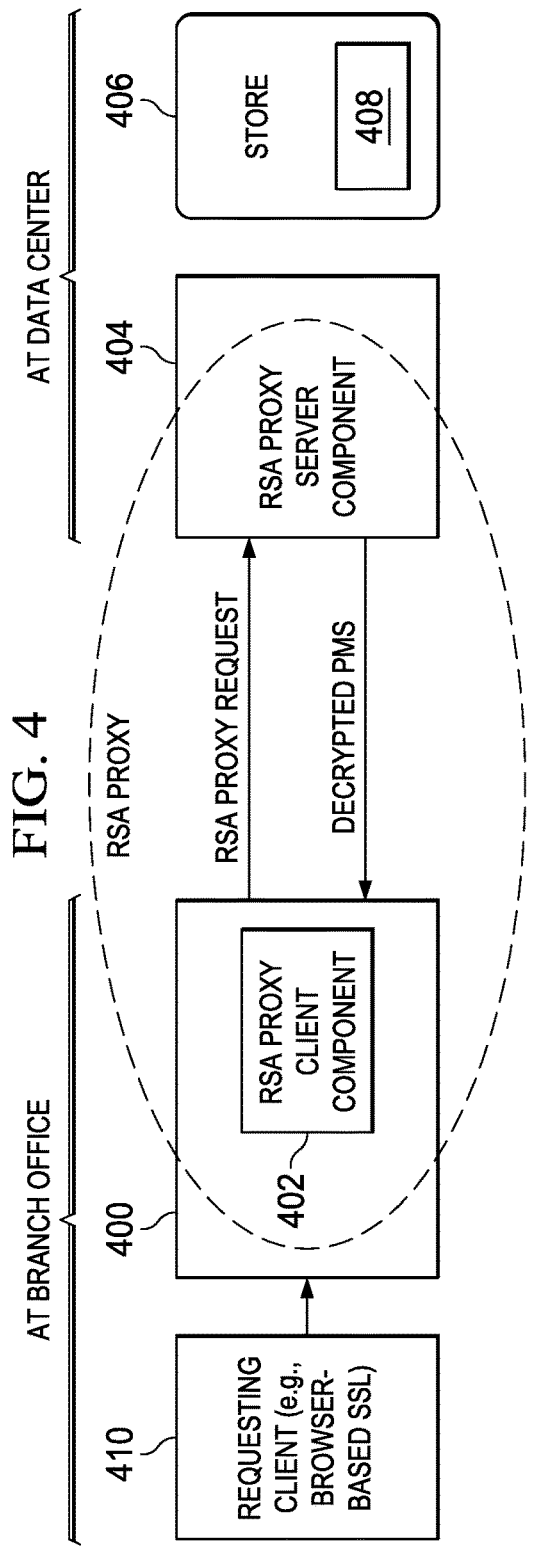
FIG. 4 illustrates the RSA proxy technique.

In particular, and with reference to FIG. 4, during the SSL/TLS handshake, the decryption of the encrypted pre-master secret, occurs externally to (i.e., remotely from) the normal SSL termination point (the SSL server). To this end, the SSL/TLS server 400 at the termination point includes a "client component" 402 of a proxy server whose "server component" 404 is located remotely. The server component 404 has associated therewith a data store 406 in which decryption key(s) 408 are maintained. These decryption keys 408 are not accessible to the client component 402. As will be described, during an SSL/TLS handshake, and instead of decrypting encrypted pre-master secrets itself, the client component 402 proxies (forwards) an encrypted pre-master secret that it receives (from a conventional SSL/TLS client 410) to the server component 404 and receives, in return, a decrypted pre-master secret. The remainder of the SSL/TLS transaction (between SSL/TLS server 400 and the SSL client 410) completes normally. In this approach, SSL/TLS private keys are not stored on the SSL/TLS server (or, more generally, at the SSL/TLS termination point).

Preferably, the client component 402 and the server component 404 of the proxy server are based on RSA encryption; thus, these components are sometimes referred to herein as components of an RSA proxy. The forwarding of the encrypted pre-master secret (from the client component to the server component) is sometimes referred to herein as an RSA proxy request. While RSA is a preferred algorithm, other asymmetric encryption algorithms may be used as well.

Referring now back to FIG. 3, branch office and data center machines preferably use a secure connection (e.g., mutually-authenticated SSL/TLS connections) to communicate and pass traffic. Other types of secure connection (e.g., IPSec VPN) may be used. These connections are used for RSA proxy requests, user data, and other traffic. As noted above, the RSA proxy client component executes in the branch office, while its associated server component executes in the (more secure) data center. In one embodiment, every machine has a single client certificate and keypair used for communication with peers. When a new machine is provisioned (e.g., by the CDN customer portal), the machine generates a private key and CSR (Certificate Signing Request) and sends the latter to the AMG. The CSR preferably contains a pair of identifiers, such as a unique serial number for the branch office or data center machine, as well as a serial number for the CSR version. The AMG signs the CSR (preferably using a certificate authority (CA) associated with the CDN) and sends the certificate to the branch office machine. Additionally, the AMG sends a message containing the certificate details (serial number pair) to any data center that may communicate with the branch office (based upon the peer configuration in the portal). The AMG, using other CDN key management infrastructure, signs the client and server CSRs (preferably using the CDN-associated CA). Preferably, both the branch office machine and data center machine maintain a collection of valid peers and CAs. This collection is updated by the AMG to support rotation and revocation. Moreover, preferably each box has a copy of the CA as well as a whitelist of the acceptable peers, identified by box and certificate serial number. To establish the mutual authentication, both sides of the mutual SSL connection (in other words, the RSA proxy client component on one side, and the RSA proxy server component, on the other) verify that the peer certificate chain has a root node that matches the CA and contains an allowable serial number pair. The client and server components also verify that the peer certificate contains the expected machine serial number.

As shown in FIG. 4, the RSA proxy client 402 is part of the SSL/TLS transport module. In operation, when a ClientHello is received (from an incoming SSL/TLS handshake request), the SSL/TLS module checks a learning table of IP addresses (plus port) and certs. If the entry does not exist, the data is streamed unmodified. If the data center machine can perform RSA proxying for the IP and port, it will send back a new message containing the RSA proxied server cert. The SSL/TLS module adds the IP address and cert to the learning table. On a next new (not resumed) SSL/TLS transaction for that IP address, the SSL/TLS module finds the entry and knows that it will be performing an RSA proxy transaction. Learning table entries are removed if they are used for an RSA proxy request which fails (or, in the alternative, after a period of not being used). These entries can be updated by the data center machine at any time, e.g., by the proxy client sending another message with the new cert for a particular IP and port.

During the handshake, the module terminates the SSL/TLS connection and sends a ServerCertificate to the requesting client with the cert from the learning table. When the ClientKeyExchange message and ePMS are received, the module sends the RSA proxy request to the correct data center. According to this disclosure, and as noted above, the RSA proxy request and response are handled by the server component of the RSA proxy server 404, which sends and receives the data over the mutually-authenticated SSL/TLS connection. If the server component 404 of the RSA proxy server returns a failure or times-out, the SSL/TLS module (the client component 402) terminates the client connection and the handshake does not succeed.

Without limitation, the SSL/TLS module is implemented as an SSL/TLS protocol terminator. In one embodiment, it is program code build on top of standard OpenSSL.

The RSA proxy client component (the SSL/TLS module in the branch office) uses a message interface to send the RSA proxy request and response over the mutually-authenticated SSL connection. Preferably, the RSA client request is a packet that includes the following information fields: {ePMS length, ePMS, hash of a server certificate}. The response packet returned from the RSA proxy server component (the SSL/TLS module in the data center) has the following information fields: {status, decrypted PMS length, decrypted pre-master secret}.

An embodiment of the RSA proxy server component executing at the data center facility is now described. As noted, its basic operation is to receive unencrypted packets containing the request specified above and to respond with the defined response packet. Preferably, the RSA proxy server maintains a least-recently-used (LRU) cache of ePMS values. Before performing a decryption, the module checks the cache to see if the requested ePMS has been seen. This check may be performed using a hash lookup scheme. If the hash of the encrypted pre-master secret already exists in the cache, a bad status is returned to the RSA proxy client component (and an error or alert is generated for the administrator). Preferably, the server component of the RSA proxy server rate limits requests to prevent a compromised machine from using a flush attack to remove a previously decrypted secret. Preferably, the server component of the RSA proxy server also maintains a table of the certificate and keypairs for which it can act as a proxy. Using this table (which also may be implemented as a hash table) enables the proxy server to efficiently look up server keypairs (e.g., by the hash of the certificate which is sent by the client component). Once the server component of the RSA proxy server has verified the ePMS is new, it adds it to the cache, looks up the server private key in its table, decrypts the ePMS, and sends the response.

The technique described in U.S. Publication No. 2013/0156189 has many advantages. The primary advantage is that SSL/TLS private keys are not stored on the SSL server. In a distributed solution such as described above, this means that the private keys are not stored in the branch office box that is terminating SSL/TLS, but instead at the data center box that is hosting the server component of the RSA proxy server. With replay protection implemented, an attacker cannot use a compromised SSL/TLS server to decrypt previous SSL transactions. On a normal SSL server, if the key is compromised, other technologies (such as certificate revocation lists or OCSP at the client browser) must be used to prevent use of the stolen SSL/TLS key. With RSA proxy, the service provider only needs to make a configuration change in the RSA proxy server. Using this distributed approach, the computationally-expensive part of the SSL/TLS transaction, the RSA decryption, can be done on a machine with custom hardware in the data center.

If a web proxy node (at a branch office) is discovered to be compromised, the administrator simply needs to remove authenticated credentials for the compromised node. For standard SSL/TLS, the revocation would need to be done on each end user system, which may be more difficult to administer. Additionally, key rotation only needs to occur on the RSA proxy machine, rather than all the web proxy machines, as would be required with standard SSL/TLS.

The behind-the-firewall embodiment is not intended to be limiting. The RSA proxy approach may be used whenever an enterprise uses CDN technologies (such as described above) over Internet links as an optimize WAN connecting branches, data center, teleworks and mobile users to applications over the Internet. Still more generally, the approach may be used whenever one party (the client) wishes to encrypt communications via RSA-based SSL/TLS with another party (the server) and the server is not trusted to store the RSA private key directly.

In a representative implementation, the RSA proxy is implemented in software, as computer program instructions executed by a processor.

Ensuring Forward Secrecy in the RSA Proxy

As noted above, the above-described paradigm assumes that the RSA proxy server component (more generally, the "Key Owner") has good security, and that an encrypted and authenticated bi-directional communication channel with the RSA proxy client component (more generally, the "Server") to communicate the requests. If, however, security of the Server cannot be fully assured (or the Server is compromised), an individual (or computing entity) who had been watching and recording communications between the requesting client and the Server could gain access to the archived encrypted streams. This malicious third party entity would do this by simply forwarding captured ePMS's along to the Key Owner, which might then decrypt them as if the request were coming from the Server, thereby potentially allowing the malicious third party to gain access to the stream's contents. An observer also might be inclined to represent to the Key Owner that the Server has succumbed to a break-in; upon learning this untruth, the Key Owner might then simply sever all communications and no longer decrypt ePMSs on the Server's behalf. Even if audit protections are in place to protect against such schemes, time may pass before any such break-in is detected and during which valid decryptions can be requested on behalf of the bad actor.

In other words, the ePMS decryption request itself is potentially a vector for defeating forward secrecy. To counter this, the following describes a method to secure the keying material decryption stage itself from replay attacks, and to provide forward secrecy for that leg of communication. As will be seen, the technique provides the forward secrecy by ensuring that the server random value used to compute the master secret is never available in the clear on the wire.

Figure 5:
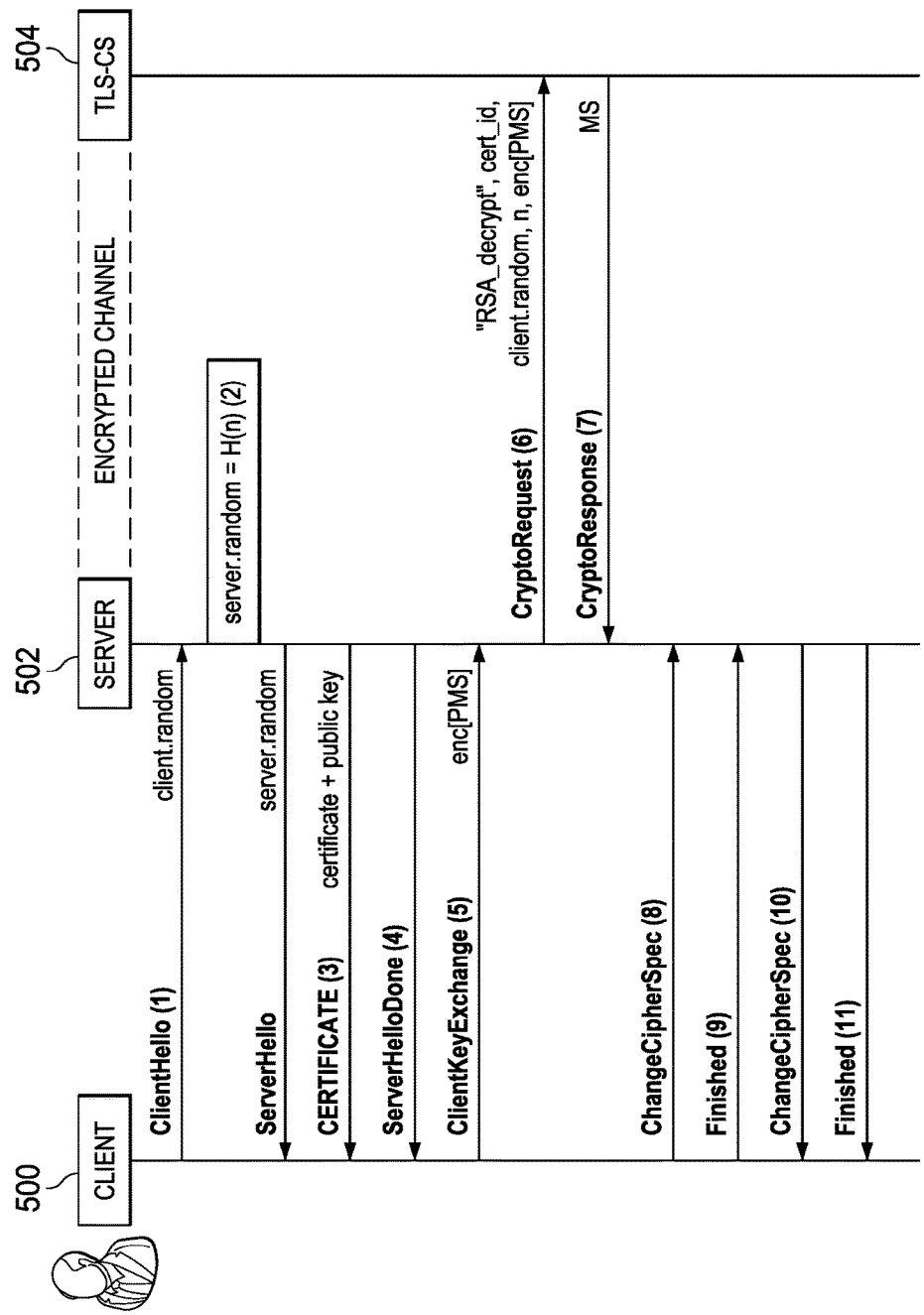
FIG. 5 depicts interactions among the client, server and cryptographic server to implement the forward secrecy according to this disclosure.

FIG. 5 illustrates the technique of this disclosure with respect to the requesting client 500, edge server host process 502, and a cryptographic server 504.

At step 1, the client 500 sends the ClientHello, including a list of supported cipher suites and the client.random value. At step 2, the edge server host process 502 selects an ephemeral value n, and applies a cryptographic hash to n in order to compute a server.random value, which is then transmitted in the ServerHello. At steps 3-4, the edge server host process 502 hands back the selected certificate to the requesting client, followed by the ServerHelloDone message. At step 5, the client 500 generates the pre-master secret, encrypts it with the certificate's public key, and sends it to edge server host process 502 in the ClientKeyExchange message. At step 6, the edge server host process 502, unable to decrypt the pre-master secret (because it does not possess the decryption key), sends it to cryptographic server 504 along with the client.random and the ephemeral n. Optimally, at this point the edge server host process purges the ephemeral value n from its memory. At step 7, the cryptographic server 504 applies the same cryptographic hash to n in order to compute the server.random value. Stated another way, at step 7, the server random value is re-computed at the cryptographic server. In this manner, the value n used to derive the server random value never travels in the clear on the wire, let alone in a manner that might be compromised by a man-in-the-middle attack.

The cryptographic server 504 then decrypts the pre-master secret, calculates the master secret using given information (namely, the client.random received from the edge server host process, and the server.random computed at the cryptographic server 504 by applying the cryptographic hash to the ephemeral value received from server 502), and sends the master secret back to the server 502. At steps 8-11, both the client 500 and server 502 use the master secret to complete the TLS handshake as normal.

The above-described mechanism is indistinguishable from regular RSA from the requesting client's perspective, but it provides forward secrecy (in the event that edge server is compromised) through the use of a cryptographically strong hash function that is applied to the ephemeral value separately by the edge server (at step 2) and by the cryptographic server (at step 7). Without limitation, the hash function is one of: SHA-1, a trapdoor function, or the like. Importantly, and to ensure the forward secrecy provided, the server 502 must erase the ephemeral value n as soon as possible, most optimally as soon as the cryptographic hash is sent to the cryptographic server. The cryptographic server erases the ephemeral value once the TLS connection is closed.

The following describes the forward secrecy enhancement of this disclosure in additional detail. It assumes that both the edge server host process and the cryptographic server share the same cryptographic hash function, which is sometimes referred to herein as a key derivation function.

As before, it is assumed that the edge server host process (the "Server") holds only the public certificate for the given domain name, and further that the private key is held by the cryptographic server (the "Key Owner").

The TLS-based exchange of this disclosure then proceeds as follows:

1. Client sends a ClientHello message with a list of ciphers and a random number.
2. Server creates a completely random secret ephemeral number N. It then performs an appropriate key derivation function (KDF) utilizing a one way hash to arrive at a new value S.
3. Server responds with a ServerHello message containing the cipher choice and the value S for its random number.
4. Server sends a ServerCertificate message containing the public certificate.
5. Server sends a ServerHelloDone message.
6. Client creates a Pre Master Secret (PMS) keying material.
7. Client encrypts PMS with the Server's public key.
8. Client sends encrypted PMS (ePMS) to Server in ClientKeyExchange message.
9. The Server receives this message, but is unable to decrypt it because it does not have the private key.
10. The Server sends the ePMS, the Client's random number, and the secret ephemeral number N to the Key Owner and immediately purges the secret ephemeral number N from its memory.
11. The Key Owner uses the same KDF, using a one-way hash to convert the secret ephemeral N to S.
12. The Key Owner then decrypts the ePMS to get the PMS.
13. The Key Owner then uses the TLS PRF function with the PMS, Client random, and the Server random number S to compute the Master Secret.
14. The Key Owner then sends the Master Secret back to the Server.
15. The Server, now having the Master Secret from the communication with the Key Owner, computes the symmetric keys (or, more generally, derivative data) by using the PRF and random numbers.
16. The Client, having the PMS and both random numbers, uses the PRF function in TLS to compute the Master Secret, and from the Master Secret computes the symmetric keys by using the PRF and random numbers again.
17. Client sends the ChangeCipherSpec message and Finished message.
18. Server sends the ChangeCipherSpec message and Finished message.

If a malicious third party (e.g., who had been recording the traffic between the Client and Server) then ever gains access to the Server, the malicious actor still is unable to gain access to those prior streams. This is because, although the Server may still be viewed as valid and authorized from the Key Owner's perspective, the third party does not have enough information to gain the correct Master Secret. At best, the malicious party has the Client random number, the Server random number S, and the ePMS. The ephemeral number N, however, is gone. As long as the KDF used to compute S from N is sufficiently strong (e.g., a hash function, a trap door function, or some other one-way function), the malicious actor will not be able to reverse S back to N. In particular, the malicious party will never have the ability to send the proper triplet to the Key Owner to retrieve the correct Master Secret.

As a variant, instead of steps 14-15 (returning the master secret), the actual encryption secrets may be generated on the Key Owner. A further extension is having the Key Owner generate one or more session tickets along with the encryption secrets, and then provide an application programming interface (API) over which a next round of encryption secrets can be obtained from those one or more session tickets. In these variants, other secret data thus is returned from the Key Owner to the Server in addition to or instead of the master secret.

Preferably, the Key Owner is a TLS-cryptographic server ("TLS-CS") process that is implemented in a rack-mounted appliance or machine that is located in a computing infrastructure facility with good physical security (e.g. locked cages, video monitoring cameras, restricted access, and the like). In this context, the notion of a Key Owner refers to the entity that possesses the key in question, as opposed to some legal right of ownership (e.g., by a CDN customer).

Preferably, an edge server host process establishes and maintains a persistent connection to the cryptographic server. The connection should be strongly authenticated and encrypted. The cryptographic server sends a message to the edge server host process identifying specifically which secrets are currently available to be used for crypto operations.

Preferably, the client side logic to communicate with the cryptographic server is implemented as a library to allow easy integration with various processes that may need to interact with TLS-CS. Preferably, when the edge server host process comes to the point in the TLS handshake when it decides on which certificate to use, branching logic first determines whether or that certificate's private key is available locally. If it is not, then the edge server host process preferably utilizes the already-established persistent connection to the cryptographic server. Preferably, the decision whether or not to send a request to the cryptographic server is made early on during the TLS handshake, meaning that information at the HTTP layer (including any CDN hostname and the contents of HTTP headers) is not available. Information that may be used to determine whether the request is sent to the cryptographic server may include, without limitation, the client IP address and geo, the SNI hostname provided (if any) along with the associated customer metadata, the cipher suites supported by the client, and the machine- or region-specific metadata of the edge server host process that is serving the request.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines. The functionality may be provided as a service, e.g., as a SaaS solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. While given components of the system have been described separately, one of ordinary skill will appreciate that some of the functions may be combined or shared in given instructions, program sequences, code portions, and the like.

Preferably, the functionality is implemented in an application layer solution, although this is not a limitation, as portions of the identified functions may be built into an operating system or the like.

The functionality may be implemented with other application layer protocols besides HTTPS, such as SSL VPN, or any other protocol having similar operating characteristics.

There is no limitation on the type of computing entity that may implement the client-side or server-side of the connection. Any computing entity (system, machine, device, program, process, utility, or the like) may act as the client or the server.

While the techniques herein are described in the context of an RSA proxy for use in an SSL communication, this is not a limitation. Moreover, the scheme may be implemented in other security protocols (i.e. other than SSL/TLS) that are protected by cryptographic techniques. More generally, the techniques herein may be used in any context in which secret data needs to be exchanged from one peer to another using asymmetric cryptography and wherein the receiving peer is not trusted to have the private key. A security protocol that is functionally equivalent to SSL or TLS and that uses the ephemeral value technique of this disclosure is within the scope.

The techniques herein generally provide for the above-described improvements to a technology or technical field, as well as the specific technological improvements to various fields including distributed networking, Internet-based overlays, secure utilization of Internet links, and the like, all as described above.

Having described our invention, what is claimed is as follows.

The invention claimed is:

1. A computer program product in a non-transitory computer readable medium for use in a data processing system comprising a hardware processor, and a memory, the data processing system located remote from a server machine, the server machine configured to interact with a client during a cryptographic Transport Layer Security (TLS) or Secure Sockets Layer (SSL) handshake between the client and the server machine, the computer program product holding computer program instructions that, when executed by the data processing system, are configured to:

store a private key corresponding to a public key of an asymmetric key pair that includes the private key and the public key, the public key included in a public certificate for a domain, the public certificate configured to be provided by the server machine to the client together with a server random value during the TLS or SSL handshake, the server random value configured to be generated by the server machine by applying a cryptographic function to an ephemeral value;

receive from the server machine an encrypted pre-master secret, together with the ephemeral value and a client random value, the encrypted pre-master secret having been generated at the client by encrypting a pre-master secret with the public key received from the server machine, the client random value having been generated at the client, and the ephemeral value having been purged from a memory of the server machine following its transmission from the server machine;

generate a master secret by (i) applying a cryptographic function to the ephemeral value to re-compute the server random value, (ii) decrypting the encrypted pre-master secret using the private key to recover a pre-master secret, and then (iii) applying a function to the client random value, the server random value, and the pre-master secret; and return the master secret to the server machine to enable completion of the TLS or SSL handshake between the client and the server machine.

2. The computer program product as described in claim 1 wherein only the data processing system maintains the ephemeral value after that value is received from the server machine.

3. The computer program product as described in claim 1 wherein the cryptographic function is a key derivation function.

4. The computer program product as described in claim 3 wherein the key derivation function is a one-way function.

5. The computer program product as described in claim 1 wherein the function is a TLS pseudorandom function (PRF).

6. The computer program product as described in claim 1 wherein the computer program instructions are further configured to establish and maintain a persistent connection to the server machine.

7. The computer program product as described in claim 1 wherein the ephemeral value is a random number.

8. The computer program product as described in claim 1 wherein the asymmetric key pair is an RSA key pair.

* * * * *